US 8,244,520 B2

(12) United States Patent
Ashworth et al.

(10) Patent No.: US 8,244,520 B2
(45) Date of Patent: Aug. 14, 2012

(54) USE OF DEFINING IGNORABLE RECTANGLES TO ASSIST WITH ITERATIVE TRANSLATION TESTING

(75) Inventors: Lindsey Louise Ashworth, Romsey (GB); James Stuart Taylor, Southhampton (GB); Sarah Michelle Drewery, Hythe (GB); Stephen Mark Hughes, Portsmouth (GB)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 12/166,095

(22) Filed: Jul. 1, 2008

(65) Prior Publication Data

US 2010/0004917 A1    Jan. 7, 2010

(51) Int. Cl.
*G06F 17/28* (2006.01)
*G06F 17/20* (2006.01)
*G10L 21/00* (2006.01)
*G06K 9/00* (2006.01)
*G06K 9/18* (2006.01)
*G06K 9/46* (2006.01)

(52) U.S. Cl. ......... 704/8; 704/2; 704/7; 704/3; 382/181; 382/182; 382/190

(58) Field of Classification Search ............... 704/8
See application file for complete search history.

(56) References Cited

U.S. PATENT DOCUMENTS 5,974,372 A * 10/1999 Barnes et al. ............... 704/8
6,859,778 B1 * 2/2005 Bakis et al. ............... 704/277
2004/0230952 A1  11/2004 Massaro et al.
2006/0045351 A1   3/2006 Jin et al.
2006/0241932 A1* 10/2006 Carman et al. ............... 704/2
2008/0127253 A1   5/2008 Zhang et al.

OTHER PUBLICATIONS

LabelTool: A Localization Application for Devices with Restricted Display Areas by Jimmy C.M. Lu, Lars Akerman and Karin Spalink, all of Ericsson HFID as published in AMTA 2000, LNAI 1934, pp. 202-208, J.S. White (Editor), Springer-Verlag, Berlin, Heidelberg, 2000.*

* cited by examiner

*Primary Examiner* — James S. Wozniak
*Assistant Examiner* — Neeraj Sharma
(74) *Attorney, Agent, or Firm* — Locke Lord LLP

(57) ABSTRACT

The example embodiments relate to a method for assisting in the translational testing of computer software. A translated panel, which may include a translatable portion and a continuously dynamic portion, may be provided. An overlay that includes only the continuously dynamic portions of the panel may be produced. The overlay may be applied to first and second versions of the panel to produce first and second iterations of the panel, respectively, wherein each iteration does not include the continuously dynamic portion of the panel. The translatable portions of the first and second iterations may be compared to determine whether the translatable portions are different. If the translatable portions are different, then the panel may be retested for translational accuracy; if the translatable portions are not different, then the program may indicate that the second iteration is not different from the first iteration.

1 Claim, 2 Drawing Sheets

USE OF DEFINING IGNORABLE RECTANGLES TO ASSIST WITH ITERATIVE TRANSLATION TESTING

FIELD

The example embodiments relate to a method for assisting in the translational testing of computer software.

BACKGROUND

Computer software manufacturers strive to simultaneously release the domestic and national language versions of a product. In order to do so, each panel of the product must be translated and the accuracy of the translation must be verified. Translation Verification Testing (TVT) is a very time-consuming procedure that occurs at the end of the development process, which results in a backlog of screens to be tested and possibly retranslated and delays the release of the product.

It would be advantageous to minimize the amount and complexity of translational testing in order to decrease costs and increase the speed of the product to market.

SUMMARY

The example embodiments relate to a method for assisting in the translational testing of computer software. A translated panel, which may include a translatable portion and a continuously dynamic portion, may be provided. An overlay that includes only the continuously dynamic portions of the panel may be produced. The overlay may be applied to first and second versions of the panel to produce first and second iterations of the panel, respectively, wherein each iteration does not include the continuously dynamic portion of the panel. The translatable portions of the first and second iterations may be compared to determine whether the translatable portions are different. If the translatable portions are different, then the panel may be retested for translational accuracy; if the translatable portions are not different, then the program may indicate that the second iteration is not different from the first iteration.

DETAILED DISCUSSION OF EMBODIMENTS

Figure 1:
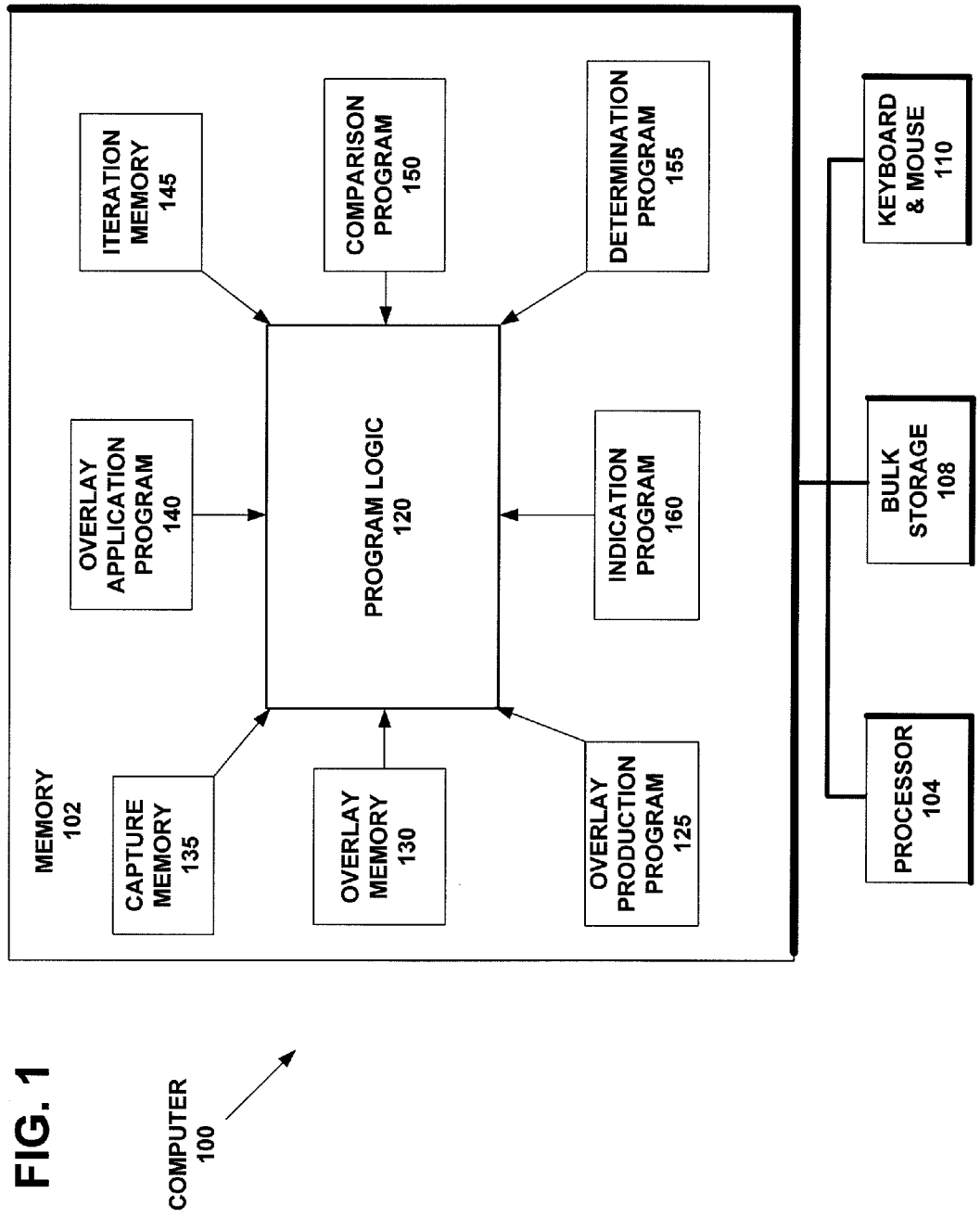
FIG. 1 is an example embodiment of the system.
Figure 2:
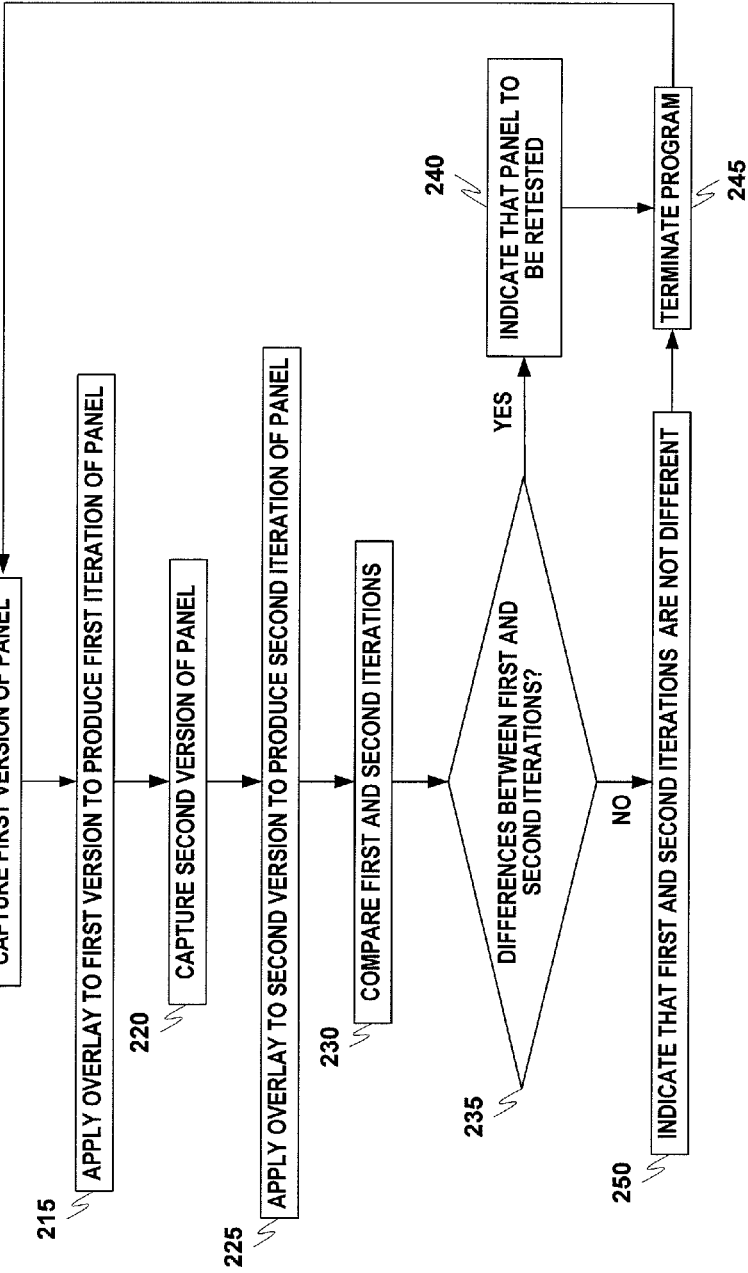
FIG. 2 illustrates a flow chart of a process according to at least one example embodiment.

FIG. 2 is a flow diagram of a program logic 120, which can be embodied as a sequence of computer program instructions stored in the memory 102 of the computer 100 of FIG. 1. The program logic 120 is executed by the processor 104 to carry out the functions of the embodiments.

Referring to FIG. 2, Step 200 discloses providing a panel. The panel may be a screen, screenshot, or any other graphical or display image associated with a computer program. A computer program may include a plurality of panels, each of which is translated and verified for each national language version. Each panel may be provided from a network or server to the computer 100 in FIG. 1, and may be accessed manually by the user with the keyboard and mouse 110 or automatically during development.

Each panel may include a translatable portion and a continuously dynamic portion. A continuously dynamic portion may be a portion of the panel that changes without a corresponding change to the code for the panel, such as the system clock, system dates, and user data. These continuously dynamic portions can interfere when comparing different versions of the panel because, by their nature, they inherently change. As such, the continuously dynamic portions do not have to be tested for translational accuracy. The translatable portion of the panel may be the portion that changes when the code for the panel changes, and may include each portion of the panel other than the continuously dynamic portion.

The panel may be translated from a first language to a second language. If the software is coded in English, for example, the code must be translated so that the panel reflects a non-English language. Software translation may occur in any manner known to those of ordinary skill in the art, including human manipulation of text strings in the source code and computer translation programs.

Step 205 discloses producing an overlay from the panel using the overlay program in order to determine whether the translatable portion of each panel has changed. The overlay may be a screen or filter comprising an ignorable shape corresponding to each continuously dynamic portion of the panel. For example, the overlay may include the coordinates for a rectangle corresponding to the system clock. The overlay may be applied to each version of a panel to filter or screen the continuously dynamic portions of the panel and allow the translatable portions to be analyzed separately from the continuously dynamic portions. An overlay may be produced for each respective panel, and may be updated based upon the addition, deletion, or modification of a continuously dynamic portion of the panel during development. The overlay for each panel of the program may be saved in the overlay memory 130, which is part of the memory 102, or anywhere on the computer, system, or network that the overlay can be accessed.

Step 210 discloses that, after navigating to the desire panel of the program, a first version of the panel may be captured and saved to the capture memory 135. The first version may be the panel at any time prior to the end of program development and testing.

Step 215 discloses applying the overlay to the first version of the panel using the overlay application program 140. The overlay application program 140 may find and execute the overlay for the specific panel. The application of the overlay to a first version of the panel may screen or filter the continuously changing portion of the first version to produce a first iteration of the panel that does not include the continuously dynamic portion. The overlay application program 140 may include any known method of extracting data from the panel, such as screen scraping. The first iteration may then be saved to the iteration memory 145, which is part of the memory 102, or anywhere on the computer, system, or network that the iteration can be accessed.

Step 220 discloses that, after navigating to the desire panel of the program, a second version of the panel may be captured and saved to the capture memory 135. The second version may be the panel at a time later in development than the time of the first version.

Similar to Step 215, Step 225 discloses applying the overlay to the second version of the panel using the overlay application program 140 to produce a second iteration of the panel. The second iteration may then be saved to the iteration memory 145, which is part of the memory 102, or anywhere on the computer, system, or network that the iteration can be accessed.

Step 230 discloses comparing the translatable portions of the first and second iterations. Such a comparison may be performed using comparison program 150, which may be a binary file comparison, an image comparison program, or any other comparison method or program known to those skilled in the art.

Step 235 discloses determining whether the translatable portions of the first and second iterations are different, which may be performed using determination program 155. If the first and second iterations are determined to be different, then the program, at Step 240, may indicate using the indication program 160 that the panel should be retested for translational accuracy, such as by highlighting the areas that changed from the first version to the second version. The program 120 may then terminated at Step 245. If the first and second iterations are determined to not be different, then the program, at Step 250, may indicate using the indication program 160 that the second iteration is not different from the first iteration, such as by visually marking the panel or designating the panel as unchanged. The process 120 may then be terminated at Step 245. The process may be repeated after termination for each successive version of the panel, such as by reverting to Step 210.

Using such an iterative translation process, each panel may be shipped to translation and TVT several times throughout the development cycle, which may eliminate the need to retest identified panels and decrease the number of panels to be retested. The program logic 120 may be executed by the user or may execute automatically during development.

The embodiments and examples described above are not intended to be limiting, and may be embodied in many forms that are not specifically disclosed herein. Changes and modifications are not precluded and may be made within the spirit and scope of the embodiments.

The invention claimed is:

1. A method comprising:

providing a panel to a device, the panel including a translatable portion that changes when code for the panel changes and a continuously dynamic portion that changes when code for the panel does not change, the panel being translated from a first language to a second language;

producing an overlay from the panel using the device, the overlay comprising an ignorable shape corresponding to the continuously dynamic portion of the panel;

applying the overlay to a first version of the panel using the device to block the continuously dynamic portion of the first version of the panel from a data-extraction procedure to produce a first iteration of the panel that isolates the translatable portion of the panel, such that the first iteration does not include the continuously dynamic portion;

applying the overlay to a second version of the panel using the device to block the continuously dynamic portion of the second version of the panel from a data-extraction procedure to produce a second iteration of the panel that isolates the translatable portion of the panel, such that the second iteration does not include the continuously dynamic portion;

comparing the translatable portions of the first and second iterations using the device; and determining whether the translatable portions of the first and second iterations are different using the device; wherein if differences are determined, testing the accuracy of the translation of the panel, and if no differences are determined, indicating that the second iteration is not different from the first iteration.

\* \* \* \* \*